United States Patent [19]

Nogami et al.

[11] Patent Number: 4,922,872
[45] Date of Patent: May 8, 1990

[54] ENGINE BRAKE SYSTEM

[75] Inventors: Masaaki Nogami, Machida; Akira Hasegawa, Fujisawa; Hiroshi Nojima, Machida; Mitsuhiro Murata, Yokohama, all of Japan

[73] Assignees: Tokyo-Buhin Kogyo Co., Ltd., Kanagawa; Isuzu Gidoshiya Kogyo Co., Ltd., Tokyo, both of Japan

[21] Appl. No.: 257,220

[22] Filed: Oct. 13, 1988

[30] Foreign Application Priority Data

Oct. 14, 1987 [JP] Japan ................ 62-257079

[51] Int. Cl.$^5$ .............................. F02D 31/00
[52] U.S. Cl. ..................... 123/319; 123/320
[58] Field of Search ................ 123/319, 320

[56] References Cited

U.S. PATENT DOCUMENTS

| | | | |
|---|---|---|---|
| 1,280,852 | 10/1918 | Root | 123/319 |
| 2,365,412 | 12/1944 | Janes | 123/319 |
| 3,490,567 | 1/1970 | Clark et al. | 123/320 |

FOREIGN PATENT DOCUMENTS

| | | |
|---|---|---|
| 60-26244 | 2/1985 | Japan . |
| 62-105862 | 7/1987 | Japan . |
| 252111 | 12/1926 | United Kingdom . |

*Primary Examiner*—Craig R. Feinberg
*Attorney, Agent, or Firm*—Flynn, Thiel, Boutell & Tanis

[57] ABSTRACT

An engine brake system comprising, in combination, a power absorbing oil pump driven in operative linkage with the crank shaft of the engine and a mechanism for controlling discharge pressure of said oil pump is disclosed. The pressure control mechanism comprises a main valve designed to be opened with a lift inversely proportional to the braking torque of the engine, a mechanism for adjusting the pressure on the back side of the main valve and a valve for switching the pressure on the back side of the main valve, all of which are provided in a valve box having an oil hole communicated with the discharge port of the oil pump. According to this system, in accordance as the engine speed increases, the lift of the main valve is reduced to elevate the power absorbed by the oil pump. Thus, this system is particularly useful for engine brake for vehicles.

10 Claims, 2 Drawing Sheets

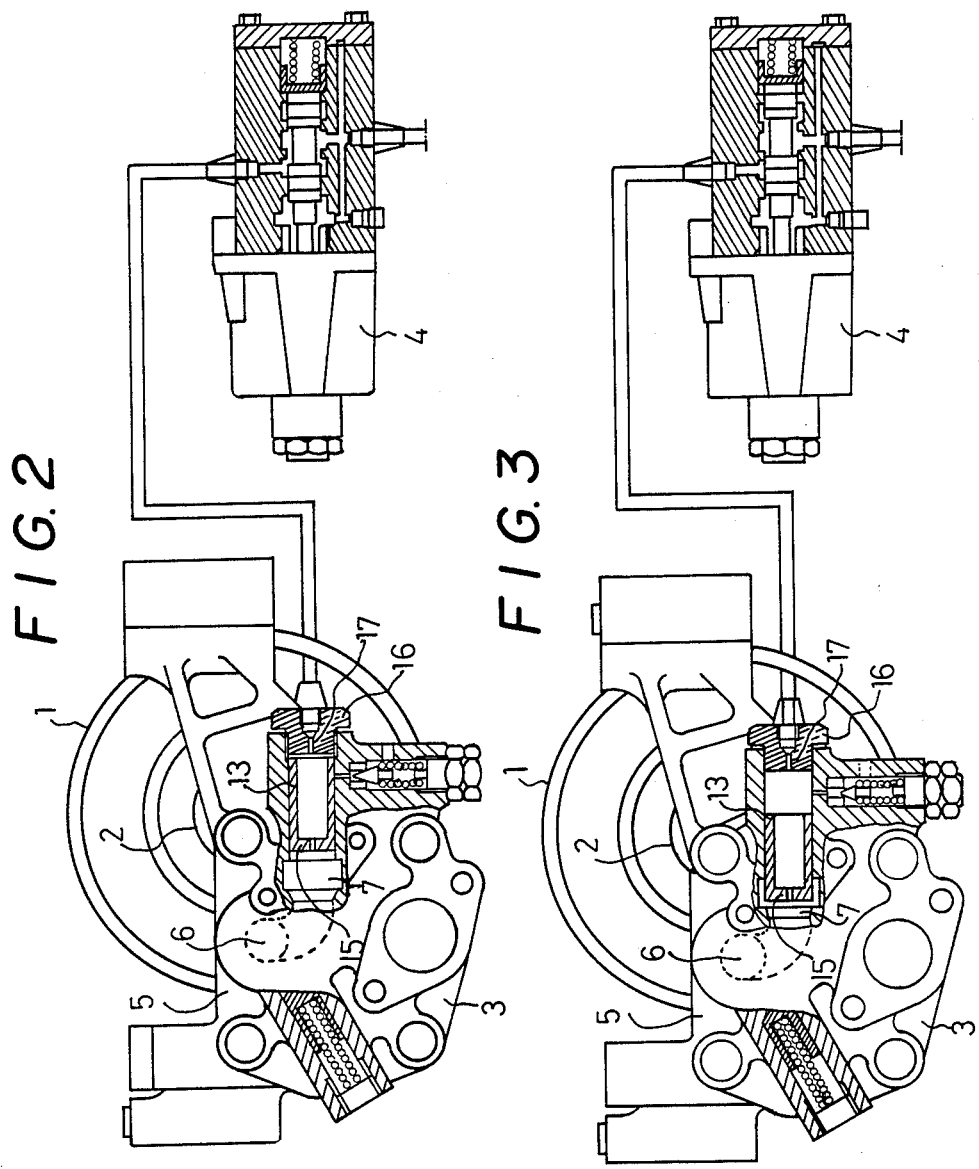

ENGINE BRAKE SYSTEM

BACKGROUND OF THE INVENTION (1) Technical Field of the Invention

The present invention relates to an engine brake system featuring the provision of an oil pump designed for absorbing power, either in the inside or the outside of the engine and separately from the engine lubricating oil pump, to enable direct control of the speed of the crank shaft of the engine.

(2) Prior Art

For braking an engine, there is generally used an exhaust brake system in which the sectional area of the exhaust port of the engine is controlled by opening or closing a butterfly valve—which is provided in the exhaust pipe of the engine to block the exhaust port—to elevate the exhaust pressure in the cylinder to thereby enhance the effect of engine brake.

Regarding the engine braking system using an oil pump provided specifically for engine brake separately from the engine lubricating oil pump, there are known no other techniques than those disclosed in Japanese Utility Model Unexamined Publication Nos. 60-26244 and 62-105862 both of which had been filed by the applicant of the present application.

A wheel brake which is low in radiating capacity in comprison with heat build-up by the brake when the vehicle is running on a way with a long negative gradient tends to suffer from overheat in long time use, so that in such a case engine brake needs to be used.

The exhaust brake system, however, has the problem that in use with a supercharged engine, it may fail to effec sufficient brake of the engine. As a means for increasing the engine output, a super charger with an intercooler is used to elevate the engine output while keeping the cylinder capacity of the engine as small as possible, and in this case, when using an exhaust brake system which controls the engine output by narrowing the exhaust port of the engine, the engine output may not be lowered as desired even if the exhaust port of the engine is narrowed down.

On the other hand, in the case of the engine brake system disclosed in Japanese Utility Model Unexamined Publication No. 60-26244 in which a cut off valve for opening and closing the oil supply pipe is provided at the discharge port of the oil pump, and this cut off valve is operated in concert with the exhaust pressure receiving means to control the engine output, there is the problem that the rate of change engine braking torque for the variation of engine speed is not constant since the cut off valve is incapable of adjusting the oil feed in the oil supply pipe, that is, the cut off valve has no oil feed adjusting function. There is also the problem that the mechanism for operatively linking the cut off valve with the exhaust pressure receiving means is complicated.

Further, in the case of the engine brake system disclosed in Japanese Utility Model Unexamined Publication No. 62-105862 in which a by-pass valve closed during the application of engine brake is provided in a pipe connecting the discharge port and the intake port of oil pump, and the discharge port of said oil pump is connected to the intake port of the engine lubricating oil pump through an oil supply pipe throttling mechanism, there is the problem that mechanism for adjusting pressure in the oil supply pipe of the oil pump is too large to fit in the inside of the engine unit.

OBJECT OF THE INVENTION

The object of the present invention is to provide an engine brake system featuring the provision of an oil pump for power absorption arranged in operative connection to the crank shaft of the engine, said oil pump being adapted in operative combination with a control device comprising a control valve designed to operate to fully open the main valve when the engine requires no braking force and open the main valve in inverse proportion to power absorption of the oil pump when the engine requires a braking force, thereby controlling power absorption of said oil pump to enable direct control of the rotation of the crank shaft and thus eliminating said problems of the prior art.

BRIEF DESCRIPTION OF THE DRAWINGS

FIG. 2 is a general view, with parts shown in section, of the engine brake system in a non-operative state.

FIG. 3 is a a general view, with parts shown in secetion, of the engine brake system in an operative state.

DETAILED DESCRIPTION OF THE INVENTION

An embodiment of the present invention will be described in detail below with reference to the accompanying drawings.

Figure 1:
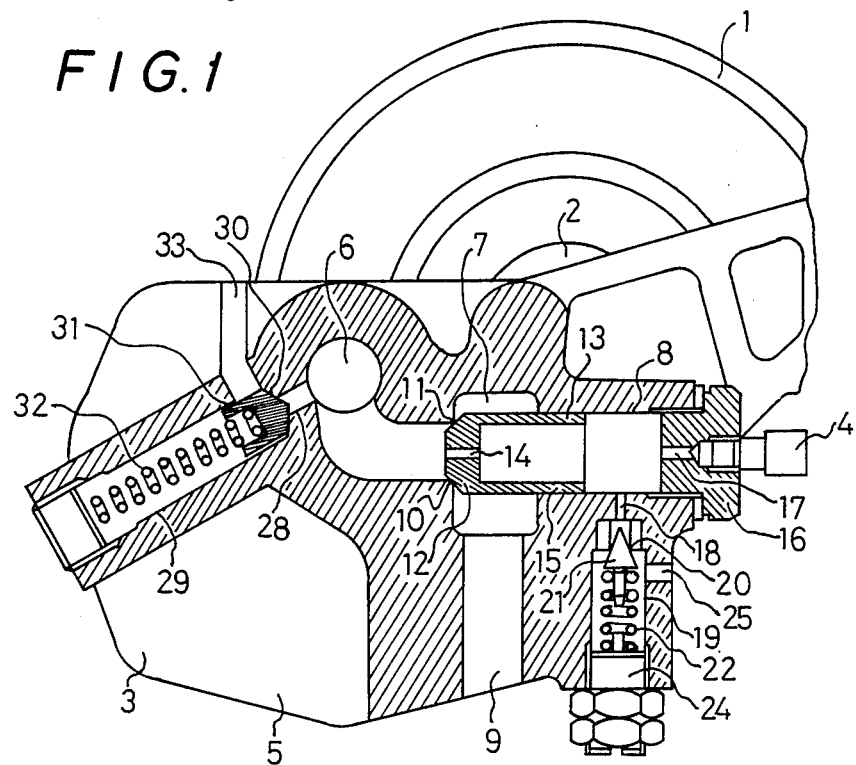
FIG. 1 is a sectional view of the engine brake system according to this invention, with parts cut out.

Referring to FIG. 1, numeral 1 designates a drive part, 2 a gear pump, 3 a control valve, and 4 a change-over valve. Drive part 1 is arranged in operative linkage with the crank shaft of the engine and the drive shaft of gear pump 2 through a V-pulley or gearing. Gear pump 2 has its radial clearance, side clearance, axial diameter and bearing strength designed to be able to absorb power of the engine. No pump designed for oil feed alone is used. Gear pump 2 is so designed that the engine lubricating oil will be used jointly by said gear pump 2 and the engine lubricating oil pump. Control valve 3 comprises a valve box 5 and a main valve 15. In the valve box 5 is provided an oil hole 6 in communication with the discharge port of gear pump 2. Provided contiguous to said oil hole 6 is an oil sump 7 having a larger diameter and extending in the direction orthogonal to the diameter along a length greater than ⅓ of the diameter of said oil hole 6. Also provided contiguously to and concentrically with said oil sump 7 is a valve body guide hole 8 having a larger diameter than said oil hole 6 and opening to the end face of valve box 5. There is further provided, in communication with said oil sump 7, an oil outlet 9 having the same diameter as said oil hole 6 and opening to the end face of said valve box 5. At a joint edge of said oil hole 6 and oil sump 7 is provided a valve box seat 10 having a narrow frustoconical seal surface. Main valve 15 comprises a frustoconical valve head 12 having a valve body seat 11 in abutment against valve box seat 10 to shut off the lubricating oil, a cylindrical valve drum 13 formed contiguous to said valve head 12 so as to slidingly fit into valve guide hole 8, and a small-diameter hole 14 passing centrally through said valve head 12. Said main valve 15 fits in valve guide hole 8. Screwed into the open end of said valve guide hole 8 is a control plug 16. At the center of said guide hole 8 is provided a control hole 17 which extends through said control plug 16. Control hole 17 is connected to a manual or electromotive change-over valve 4 which can be switched into two positions: full-closed and full-open, as shown in FIGS. 2 and 3. In valve guide hole 8 is provided a pressure adjusting mechanism for adjusting the back pressure of main valve 15 in said guide hole 8. Pressure adjusting mechanism comprises a pressure adjusting slot 18 opening to the back side of main valve 15 in valve guide hole 8 and a pressure adjusting chamber 19 formed contiguous to and concentric with said slot 18 with a larger diameter than said slot and opening to an end face of valve box 5. At a joint edge of said pressure adjusting slot 18 and pressure adjusting chamber 19 is formed a pressure adjusting valve seat 20, and a conical valve body 21 for opening and closing said pressure adjusting valve seat 20 is provided in said pressure adjusting chamber 19 so that said conical valve body 21 is always pressed by a spring 22 acting against the valve opening force given to said conical valve body 21 from pressure adjusting slot 18. The pressing force of spring 22 is adjusted by a pressure adjusting plug 24 threadedly secured to an open end of pressure adjusting chamber 19. Pressure adjusting chamber 19 is provided with a pressure release hole 25 opening to an end face of valve box 5. Valve box 5 is provided with a pressure regulating mechanism for regulating the maximum pressure of gear pump 2. Said pressure regulating mechanism comprises a pressure regulating hole 28 opening into oil hole 6 and a pressure regulating chamber 29 formed contiguous to and concentric with said pressure regulating hole 28 with a larger diameter than said hole 28. At a joint edge of said pressure regulating chamber 29 and hole 28 is formed a pressure regulating valve seat 30. In the inside of said pressure regulating chamber 29 are provided a frusto-conical pressure regulating valve body 31 and a coil spring 32 adapted to press said valve body 31, thereby to regulate the maximum pressure of gear pump 2. The lubricating oil which flows out by pushing up said valve body 31 is discharged out from a pressure regulating outlet opening 33.

The operating procedure and the actions of the engine brake system according to the present invention will be described below.

When the engine is in operation, gear pump 2 is run at a speed corresponding to the engine speed. When no engine brake is required, change-over valve 4 is switched to fully open the control hole 17 of control plug 16 as shown in FIG. 2. The lubricating oil discharged out from gear pump 2 pushes up main valve 15 to flow out from oil sump 7 and passes through oil outlet 9 into the oil pan. The lubricating oil passing through hole 14 of main valve 15 is also sent into the oil pan through control hole 17. In this state, neither pressure adjusting mechanism nor control mechanism operates. When engine brake is required, change-over valve 4 is switched to fully close control hole 17 of control plug 16 shown in FIG. 3. The oil discharged from gear pump 2 pushes up main valve 15, effuses from oil outlet 9 and is led into valve guide hole 8 through communicating hole 14 to introduce discharge pressure of gear pump 2 to the back side of main valve 15. Thus, main valve 15 receives both an axial force from valve box seat 10 and an axial force in the opposite direction acting to the cross-sectional area of main valve 15 and is opeted at a degree of opening where both forces are equilibrated. When the engine speed increases and the necessity for engine brake elevates, the speed of gear pump 2 increases to raise the discharge pressure. In this case, since the cross-sectional area of main valve 15 is greater than the diameter of valve box seat 10, main valve 15 further receives a force acting in the valve closing direction, which force corresponds to said area difference, thus causing a decrease of the degree of valve opening and a corresponding increase of discharge pressure of gear pump 2. With repetition of these operations, the crank shaft receives a sharply increasing braking torque. When the pressure in valve guide hole 8 increases to the extent that a braking toque exceeding the prescribed value is generated, conical valve 21 in the pressure adjusting mechanism is opened to discharge out the pressure in valve guide hole 8 from oil outlet 9 and send it into the oil pan. Further, the maximum pressure of gear pump 2 is regulated by opening pressure control valve in the pressure control mechanism and discharging out the pressure from its outlet 33.

In the present invention, the gear pump for power adsorption is operatively connected to the crank shaft, so that the power absorbed by the gear pump is directly loaded to the crank shaft and therefore the brake loss is minimized.

Figure 4:
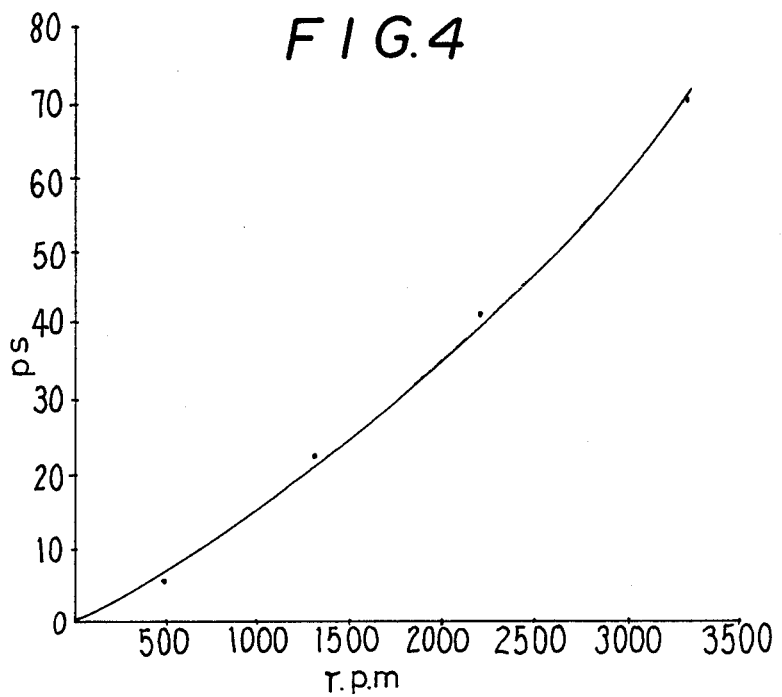
FIG. 4 is a diagram illustrating the relation between speed of the crank shaft and power absorption (horsepower) of the oil pump.

Further, since the main valve is so designed that when the engine requires a large braking torque, the valve lift is reduced to increase the power adsorption of the gear pump, there can be obtained a stable, unpulsating braking torque. From the graph of FIG. 4 where the speed (number of revolutions per minute) of the crank shaft is plotted as abscissa and the power absorption (horsepower) of the gear pump as ordinate, it is noted that when the speed of the crank shaft is over 500 r.p.m., the power absorption of the gear pump increases stably, almost proportionally to the speed of the crank shaft. Thus, there is provided according to this invention a very useful engine brake system which is capable of applying stable brake at high braking efficiency.

What is claimed is:

1. A braking apparatus for an engine having a moving drive part, comprising: a fluid pump driven by said drive part and having a fluid discharge port, said pump applying to said drive part a braking torque which increases as fluid pressure in said discharge port increases; valve means defining an opening through which fluid flowing out of said discharge port passes and having means for varying the braking torque by changing the effective cross sectional size of said opening progressively between first and second sizes, which each permits fluid flow through said opening at a respective rate greater than zero; and means responsive to a pressure increase in said discharge port for causing said valve means to reduce the effective cross sectional size of said opening from said first size to said second size.

2. An apparatus as recited in claim 1, wherein said valve means includes a valve seat, a passageway which communicates with said discharge port and opens through said valve seat, and a valve member supported for movement toward and away from said valve seat, said opening being in a region between said valve member and said valve seat.

3. An apparatus as recited in claim 2, wherein said valve means includes an oil outlet which communicates with said passageway through said valve seat, and a guide hole which communicates at one end with said oil outlet and which has said valve member slidably supported therein, and wherein said means responsive to a pressure increase in said discharge port includes an opening which extends through said valve member and provides fluid communication between opposite sides thereof.

4. An apparatus as recited in claim 3, wherein said valve member is movable to a position in which said valve member is engaging said valve seat and in which said opening through said valve member communicates at one end with said passageway and at its other end with said guide hole.

5. An apparatus as recited in claim 3, wherein a cross sectional area of said valve member on a side thereof remote from said valve seat is larger than a cross sectional size of said passageway.

6. An apparatus as recited in claim 5, wherein said valve means includes a control hole which communicates with said guide hole, and includes selectively actuable changeover valve means for selectively permitting and obstructing fluid flow through said control hole.

7. An apparatus as recited in claim 5, including first pressure regulating valve means communicating with said passageway for preventing fluid pressure in said passageway from exceeding a first predetermined value, and second pressure regulating valve means communicating with said guide hole for preventing fluid pressure in said guide hole from exceeding a predetermined pressure value.

8. An apparatus as recited in claim 7, wherein said first pressure regulating valve means includes a first regulating hole which communicates at a first end with said passageway and at a second end with a first regulating chamber, a first regulating valve member supported in said first regulating chamber for movement between positions permitting and obstructing fluid flow through said first regulating opening, and resilient means yieldably urging said first regulating valve member toward said position obstructing fluid flow through said first regulating opening; and wherein said second regulating valve means includes a second regulating opening which communicates at a first end with said guide hole and communicates at a second end with a second regulating chamber, a second regulating valve member supported in said second regulating chamber for movement between position permitting and obstructing fluid flow through said second regulating opening, and resilient means yieldably urging said second regulating valve member toward said position obstructing fluid flow through said second regulating opening.

9. An engine brake system comprising:
   a power absorbing pump driven in operative linkage with a crankshaft of an engine and having a fluid discharge port, said pump applying to said crankshaft a braking torque which increases as fluid pressure in said discharge port increases;
   a valve box coupled to said discharge port of said pump and having therein a valve member guide hole, an oil outlet, and an oil hole providing communication between said discharge port of said pump and said oil outlet;
   a main valve member which is slidably disposed in said valve member guide hole and extends into an area between said oil hole and said oil outlet, wherein said main valve member progressively obstructs fluid flow through said oil hole as it moves from a first position to a second position;
   adjusting means disposed in said valve box for increasing a pressure supplied to said guide hole on a back side of said main valve member in response to an increase in engine speed, said pressure on said back side of said main valve member urging said main valve member toward its second position; and
   selectively actuable valve means for reducing said pressure on said back side of said main valve member.

10. The engine brake system according to claim 9, wherein said valve box has a valve seat extending around said oil hole, and wherein said main valve member has a cross sectional area which is slightly greater than a cross sectional area of said oil hole at said valve seat.

* * * * *